US010391905B2

(12) United States Patent
Nakao et al.

(10) Patent No.: US 10,391,905 B2
(45) Date of Patent: Aug. 27, 2019

(54) VEHICLE SEAT

(71) Applicant: TOYOTA BOSHOKU KABUSHIKI KAISHA, Aichi-ken (JP)

(72) Inventors: Tomohiro Nakao, Aichi-ken (JP); Hiromu Mizuno, Aichi-ken (JP); Kazutaka Nishiwaki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 85 days.

(21) Appl. No.: 15/819,785

(22) Filed: Nov. 21, 2017

(65) Prior Publication Data
US 2018/0147960 A1 May 31, 2018

(30) Foreign Application Priority Data
Nov. 29, 2016 (JP) .................. 2016-230823

(51) Int. Cl.
*B60N 2/75* (2018.01)
*B60N 2/58* (2006.01)
*B60N 2/60* (2006.01)
*B60N 2/70* (2006.01)
*B60N 2/803* (2018.01)

(52) U.S. Cl.
CPC ........... B60N 2/757 (2018.02); B60N 2/5825 (2013.01); B60N 2/5883 (2013.01); B60N 2/6009 (2013.01); B60N 2/70 (2013.01); B60N 2/803 (2018.02)

(58) Field of Classification Search
CPC ......... B60N 2/757; B60N 2/793; B60N 2/835
See application file for complete search history.

(56) References Cited

U.S. PATENT DOCUMENTS

| 5,292,171 | A | * | 3/1994 | Harrell | B60N 2/757 297/113 |
| 5,628,543 | A | * | 5/1997 | Filipovich | B60R 5/006 297/113 |
| 5,873,633 | A | * | 2/1999 | Lang | B60N 2/3084 297/411.32 |
| 6,073,996 | A | * | 6/2000 | Hatsuta | B60N 2/5891 297/113 |
| 6,386,629 | B1 | * | 5/2002 | Severinski | B60N 2/3011 297/188.1 |

(Continued)

FOREIGN PATENT DOCUMENTS

JP 2015-47387 3/2015

*Primary Examiner* — Shin H Kim
(74) *Attorney, Agent, or Firm* — Greenblum & Bernstein, P.L.C.

(57) ABSTRACT

A vehicle seat including a seat back including a back pad and a back cover, wherein the back pad has a recess portion opened forward, through holes penetrating in a front-and-rear direction are provided in an outer peripheral edge portion of a rear wall portion of the recess portion, and a board is mounted on a rear wall portion side of the back cover which covers the rear wall portion, wherein at least one protrusion portion extending toward an outer side in an in-plane direction of the rear wall portion is provided on a part of the board, and wherein the back cover covers an inner surface of the recess portion, and the at least one protrusion portion inserted into at least one of the through holes is engaged and mounted on a back surface portion of the back pad on an opposite side of the rear wall portion.

4 Claims, 5 Drawing Sheets

(56) References Cited

U.S. PATENT DOCUMENTS

| | | | |
|---|---|---|---|
| 6,508,508 B1* | 1/2003 | Bargiel | B60N 2/793 297/188.16 |
| 7,178,865 B2* | 2/2007 | Yetukuri | B60N 2/757 297/113 |
| 8,317,259 B2* | 11/2012 | Nakaya | B60N 2/4228 297/61 |
| 9,776,538 B1* | 10/2017 | Cheng | B60N 2/682 |
| 10,081,278 B1* | 9/2018 | Balzer | B60N 2/60 |
| 2004/0140697 A1* | 7/2004 | Yuhki | B60N 2/793 297/113 |
| 2005/0052059 A1* | 3/2005 | Oto | B60N 2/2851 297/254 |
| 2005/0218683 A1* | 10/2005 | Toyota | B60N 2/062 296/64 |
| 2006/0071529 A1* | 4/2006 | Yetukuri | B60N 2/757 297/411.32 |
| 2006/0267382 A1* | 11/2006 | McMillen | B60N 2/20 297/115 |
| 2007/0200405 A1* | 8/2007 | Rager | B60N 2/7005 297/254 |
| 2008/0150341 A1* | 6/2008 | Salewski | B60N 2/757 297/411.38 |
| 2010/0148561 A1* | 6/2010 | Runde | F16H 25/18 297/411.33 |
| 2010/0156163 A1* | 6/2010 | Daisuke | B60N 2/686 297/452.2 |
| 2012/0074188 A1* | 3/2012 | Andersson | B60N 3/10 224/539 |
| 2012/0074741 A1* | 3/2012 | Andersson | B60N 3/101 297/188.14 |
| 2014/0021764 A1* | 1/2014 | Goodhall | B60N 2/757 297/411.3 |
| 2014/0042785 A1* | 2/2014 | Sato | B60N 2/4228 297/216.14 |
| 2014/0125107 A1* | 5/2014 | Cha | B60N 2/757 297/411.3 |
| 2015/0097406 A1* | 4/2015 | Tanaka | B60N 2/5816 297/378.1 |
| 2015/0145272 A1* | 5/2015 | Cleary | B60N 3/14 296/37.16 |
| 2015/0203016 A1* | 7/2015 | Kawashima | F16B 5/0657 220/324 |
| 2015/0336489 A1* | 11/2015 | Kijima | B60N 2/686 297/188.01 |
| 2016/0059761 A1* | 3/2016 | Bohlke | B60N 3/102 296/37.8 |
| 2016/0129814 A1* | 5/2016 | Goebbels | B60N 3/108 297/188.15 |
| 2016/0288672 A1* | 10/2016 | Jakubec | B60N 2/43 |
| 2016/0325650 A1* | 11/2016 | Furukawa | B60N 2/757 |
| 2017/0066351 A1* | 3/2017 | Siqueira | B60N 2/757 |
| 2017/0158097 A1* | 6/2017 | Lee | B60N 2/757 |
| 2017/0225596 A1* | 8/2017 | Tashiro | B60N 2/206 |
| 2017/0305309 A1* | 10/2017 | Akai | B60N 2/682 |
| 2018/0118069 A1* | 5/2018 | Miyazaki | A47C 7/54 |
| 2018/0147960 A1* | 5/2018 | Nakao | B60N 2/5883 |
| 2018/0154809 A1* | 6/2018 | Kimura | B60N 3/102 |
| 2018/0178688 A1* | 6/2018 | Zuo | B60N 2/757 |
| 2018/0257529 A1* | 9/2018 | Okuma | B60N 2/757 |
| 2019/0001849 A1* | 1/2019 | Edwards | B60N 2/757 |
| 2019/0001850 A1* | 1/2019 | Johnson | B60N 2/20 |
| 2019/0084459 A1* | 3/2019 | Boddenberg | B60N 2/767 |

\* cited by examiner

VEHICLE SEAT

CROSS-REFERENCE TO RELATED APPLICATIONS

This application claims priority from Japanese Patent Application No. 2016-230823 filed on Nov. 29, 2016, the entire contents of which are incorporated herein by reference.

TECHNICAL FIELD

The present disclosure relates to a vehicle seat.

BACKGROUND

In a seat back which is a backrest of a vehicle seat, there has been disposed an armrest which is provided with a recess portion opened forward and can be switched between a state of being accommodated in the recess portion and a state of projecting forward from the recess portion. In a seat back of an automobile seat disclosed in JP-A-2015-47387, a resin board is utilized in order to mount a back cover, which is a surface material, on a recess portion provided in a back pad as a cushion body in a good appearance. Specifically, the resin board is mounted on a back surface of the back cover corresponding to a rear wall portion of the recess portion, and thus the back cover is fixed by being drawn into the recess portion of the back pad via the resin board. As a fixed structure, the back cover is mounted by being sewn to an end portion of the resin board, and the end portion of the resin board is inserted into a fitting groove provided in a side wall portion in a rear wall outer periphery of the recess portion of the back pad. Further, a tongue piece is disposed through a hole provided in the back pad, and one end of the tongue piece is fixed on the resin board and the other end of the tongue piece is fixed on the back surface of the back pad, so as to tightly fix the resin board on the rear wall of the recess portion of the back pad.

In the related art, the end portion of the resin board is inserted into the fitting groove provided in the side wall portion of the recess portion in order to fix the resin board on the rear wall of the recess portion of the back pad. However, engagement strength is not enough only by inserting the end portion of the resin board into the fitting groove provided in the side wall portion of the recess portion. Therefore, fixation with a tongue piece is added for sufficient engagement strength. A reason that the strength cannot be ensured only by inserting the end portion of the resin board into the fitting groove is that, a depth of the fitting groove cannot be molded to be a predetermined depth or more from a necessity of demolding after molding since the fitting groove is an undercut part in the back pad. As a result, there is a problem that a structure is complicated and manufacturing workability of the seat back is poor since the fixation with a tongue piece is also necessary while providing the fitting groove in the back pad.

SUMMARY

The present disclosure aims to provide a vehicle seat which includes a seat back having a recess portion opened forward and achieves the compatibility of appearance and manufacturing workability.

An aspect of the present disclosure is a vehicle seat including: a seat back including: a back pad configured to support a back of an occupant; and a back cover covering the back pad, wherein the back pad is provided with a recess portion opened forward and configured to accommodate an armrest, a plurality of through holes penetrating in a front-and-rear direction are provided in an outer peripheral edge portion of a rear wall portion of the recess portion, and a flat-plate-shaped board is mounted on a rear wall portion side of the back cover which covers the rear wall portion, wherein at least one protrusion portion extending toward an outer side in an in-plane direction of the rear wall portion is provided on a part of the board corresponding to at least one of the plurality of through holes, and wherein when the back pad is covered by the back cover, the back cover covers an inner surface of the recess portion, and the at least one protrusion portion inserted into the at least one of the plurality of through holes is engaged and mounted on a back surface portion of the back pad on an opposite side of the rear wall portion.

DETAILED DESCRIPTION

FIGS. 1 to 5 show an example applying the present disclosure to an automobile seat 10 of an embodiment of the present disclosure. In the figures, arrows show directions of an automobile and the automobile seat 10 when the automobile seat 10 is mounted to a vehicle interior of the automobile. In the following, description related to directions is based on the above directions.

Figure 1:
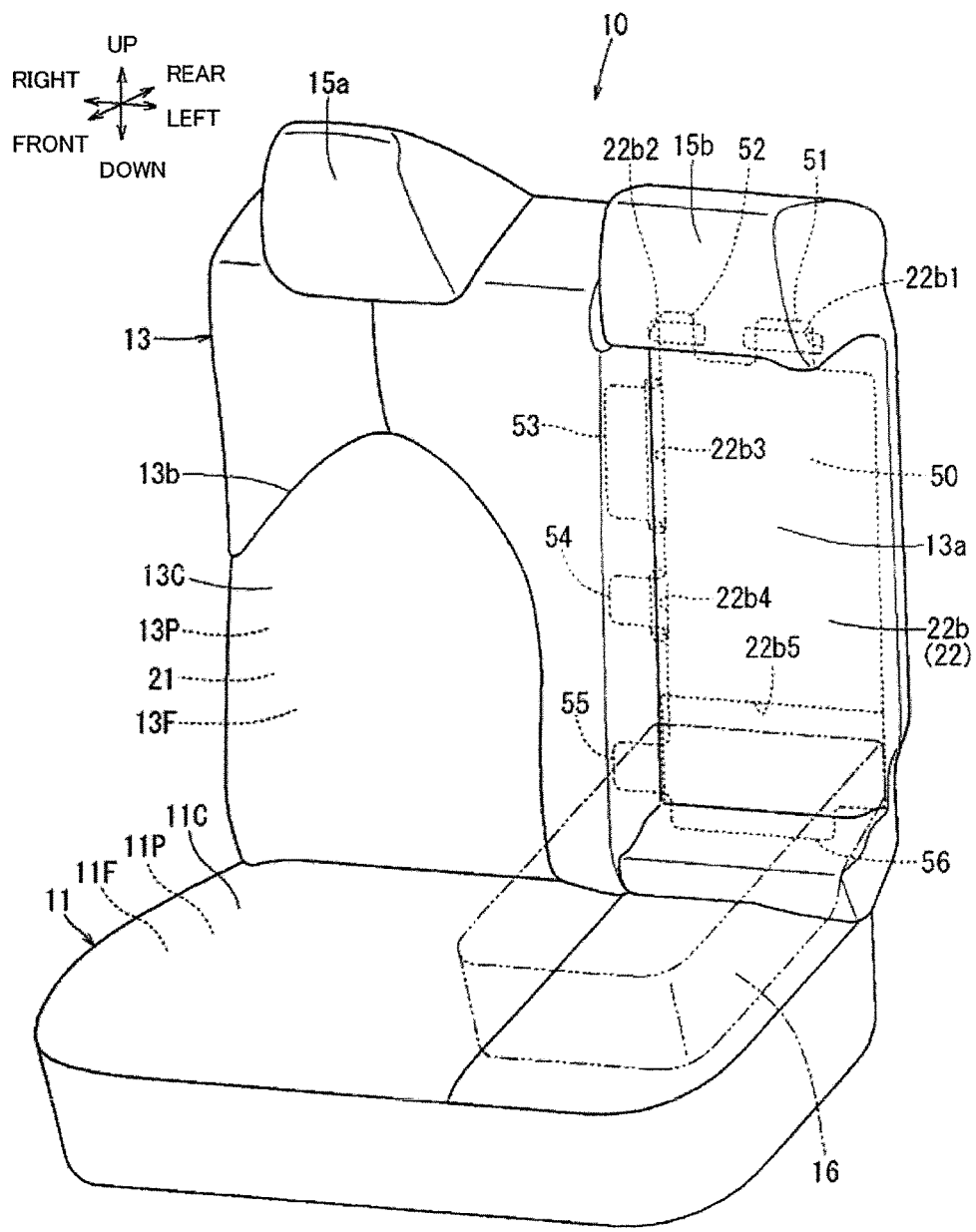
FIG. 1 is a perspective view showing a schematic configuration of a vehicle seat according to an embodiment of the present disclosure.

As shown in FIG. 1, the automobile seat 10 is a right seat which is on a 6 side of a 6:4 split-type rear seat. The automobile seat 10 includes a seat cushion 11 which is a seat portion, and a seat back 13 which is a backrest. The seat back 13 is mounted on a rear end portion of the seat cushion 11. Here, the automobile seat 10 corresponds to "vehicle seat" in the claims.

The seat cushion 11 includes a metal cushion frame 11F forming a framework, a cushion pad 11P as a cushion member supported on the cushion frame 11F, and a cushion cover 11C covered on the cushion pad 11P. The cushion frame 11F is a frame of any shape using a frame material, a wire material, a plate material, etc.

The seat back 13 includes a metal back frame 13F forming a frame, a back pad 13P as a cushion member supported on the back frame 13F, and a back cover 13C covered on the back pad 13P. The seat back 13 is formed into a substantially rectangular shape in a front view. A right headrest 15a on a right seat and a middle headrest 15b on a middle seat are formed integrally on an upper end portion of the seat back 13. Also, the middle seat part is formed with a seat recess portion 13a which can accommodate a substantially rectangular parallelepiped armrest 16. Further, a seating surface of the right seat is formed with a groove portion 13b formed into a groove shape by pulling over the back cover 13C. The groove 13b is provided for a design purpose.

The back frame 13F is formed by combining a frame material, a wire material, a plate material, etc. and supports the back pad 13P from a back surface thereof. The back pad 13P is an elastic member made of a foamed urethane resin and has a substantially rectangular shape in a front view. That is, the back cover 13C is covered over an outline shape of the back pad 13P, and thus an outline shape of the seat back 13 is formed. The back pad 13P includes a right seat portion 21 supporting a back of an occupant in the right seat, and a middle seat portion 22 forming the seat recess portion 13a which accommodates the armrest 16 which supports a back of an occupant in the middle seat.

Figure 4:
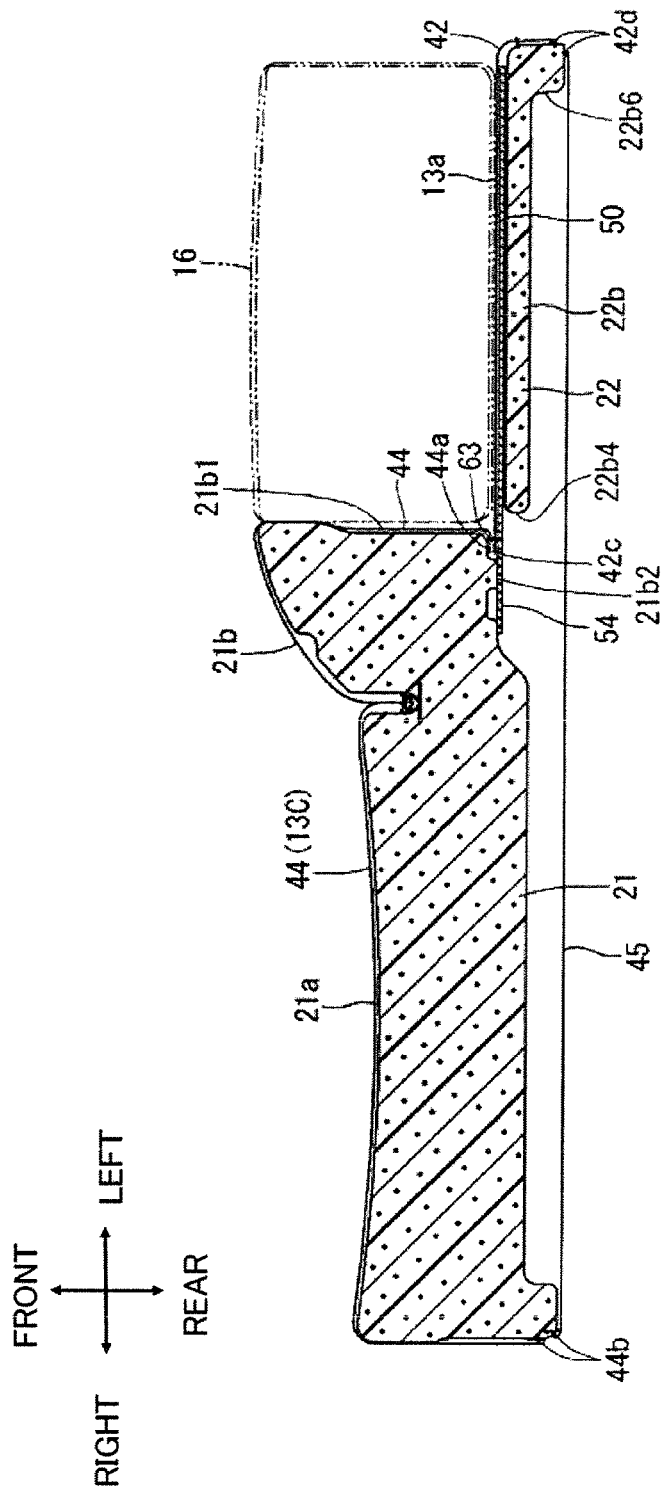
FIG. 4 is a sectional view taken along line IV-IV in FIG. 2.

As shown in FIG. 4, the right seat portion 21 includes a top plate portion 21a supporting a back of an occupant in the right seat from a rear side thereof, and a bank portion 21b supporting a back of an occupant from a left side thereof. The top plate portion 21a is formed with a groove shape corresponding to the groove portion 13b. The bank portion 21b is formed to project forward from the top plate portion 21a, and is provided with a side wall portion 21b1 which is a wall part on a left side of the bank portion 21b. A rear end portion side of the side wall portion 21b1 is coupled to a right end portion side of a rear wall portion 22b of the middle seat portion 22 described below. The side wall portion 21b1 corresponds to a right side surface of the seat recess portion 13a.

Figure 3:
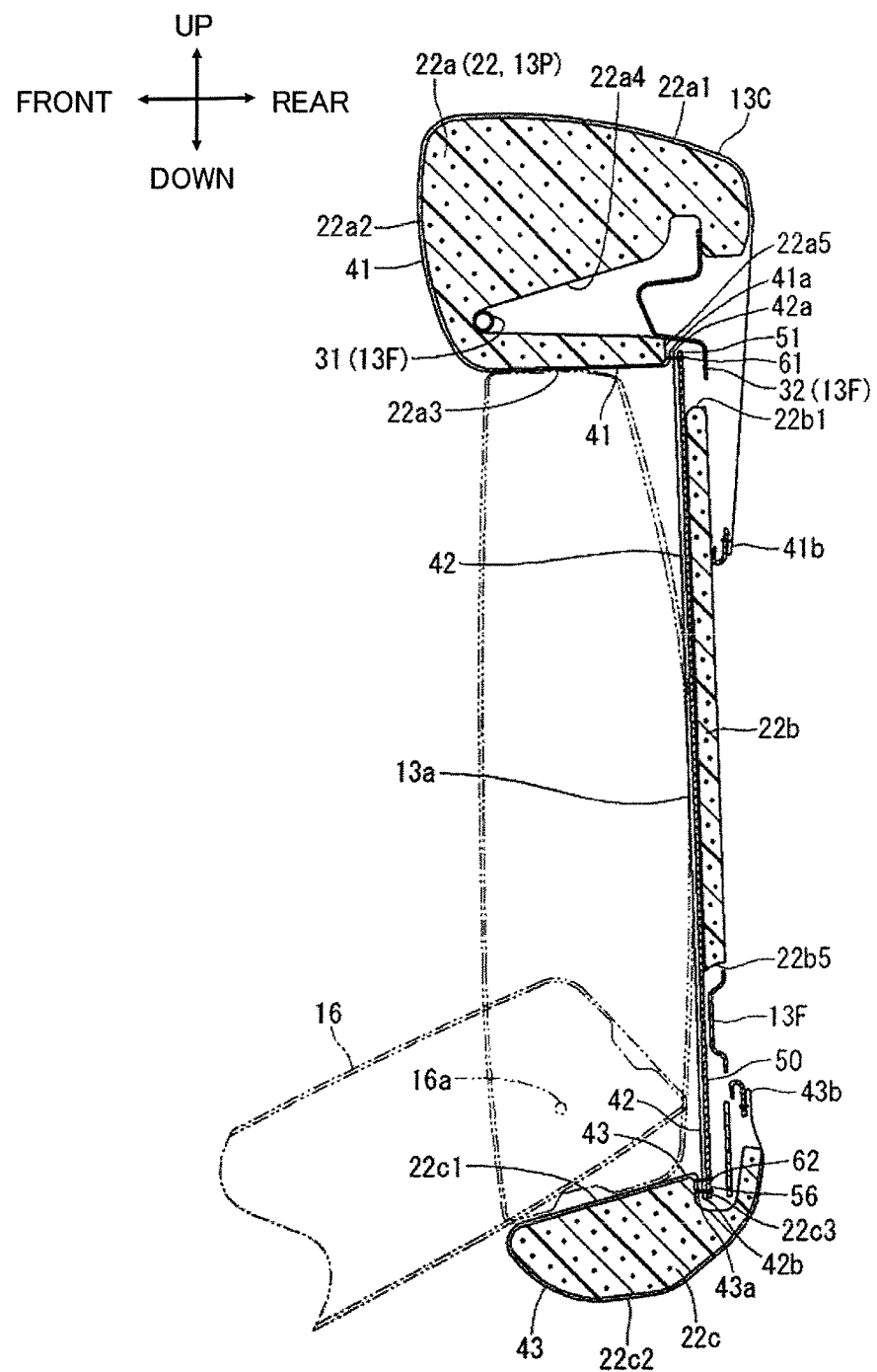
FIG. 3 is a sectional view taken along line III-III in FIG. 2.

As shown in FIG. 3, the middle seat portion 22 includes an upper wall portion 22a corresponding to an upper surface of the seat recess portion 13a and the middle headrest 15b, the rear wall portion 22b corresponding to a rear surface of the seat recess portion 13a, and a lower wall portion 22c corresponding to a lower surface of the seat recess portion 13a. The upper wall portion 22a has a substantially rectangular shape in a cross section cut along a surface extending vertically to a seat width direction and includes an upper wall upper surface portion 22a1, an upper wall front surface portion 22a2, and an upper wall lower surface portion 22a3. The upper wall upper surface portion 22a1, the upper wall front surface portion 22a2, and the upper wall lower surface portion 22a3 correspond to an upper surface of the middle headrest 15b, a front surface of the middle headrest 15b, and an upper surface of the seat recess portion 13a respectively. In the upper wall portion 22a, a substantially V-shaped notch 22a4 opened backward is made in the cross section cut along the surface extending vertically to the seat width direction, and a pipe 31 which is a part of the back frame 13F and extends along the seat width direction is disposed on a front side tip end portion of the V-shaped notch 22a4. Also, a press member 32 is disposed in a rear side of the upper wall portion 22a. The press member 32 is a part of the back frame 13F and has a hat-shaped section opened backward, and extends along the seat width direction. The lower wall portion 22c includes a lower wall upper surface portion 22c1 having a bow shape with a string substantially in an upper side thereof, and a lower wall lower surface portion 22c2 having a circular arc shape in the cross section cut along the surface extending vertically to the seat width direction. The lower wall upper surface portion 22c1 and the lower wall lower surface portion 22c2 correspond to a lower surface of the seat recess portion 13a and a lower surface of the seat back 13 respectively. The rear wall portion 22b is formed into a thin plate shape, and is disposed to couple a rear end portion side of the upper wall lower surface portion 22a3 of the upper wall portion 22a and a rear end portion side of the lower wall upper surface portion 22c1 of the lower wall portion 22c. Here, a part in which the rear wall portion 22b is surrounded by the upper wall lower surface portion 22a3, the side wall portion 21b1, and the lower wall upper surface portion 22c1, and which is opened on the left corresponds to "recess portion" in the claims.

Figure 2:
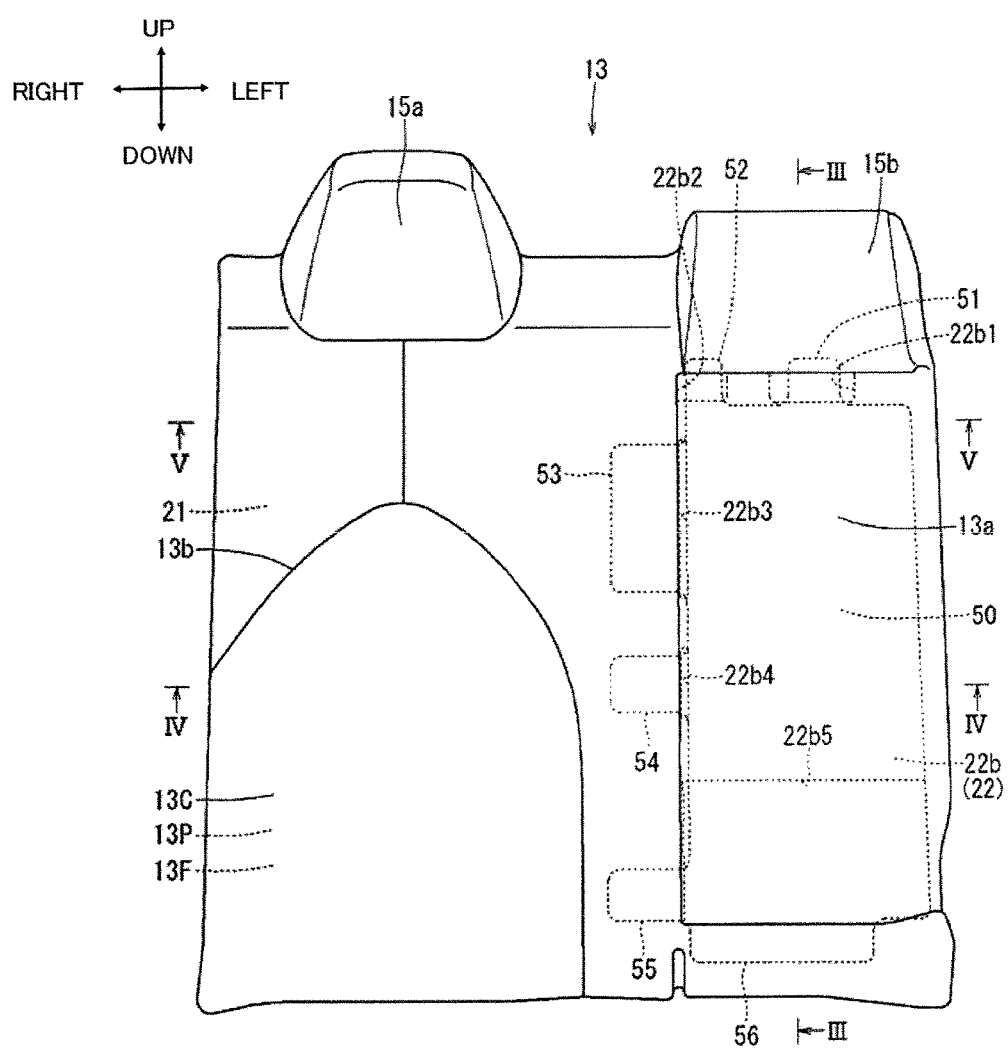
FIG. 2 is a front view of a seat back of the vehicle seat according to the embodiment.
Figure 5:
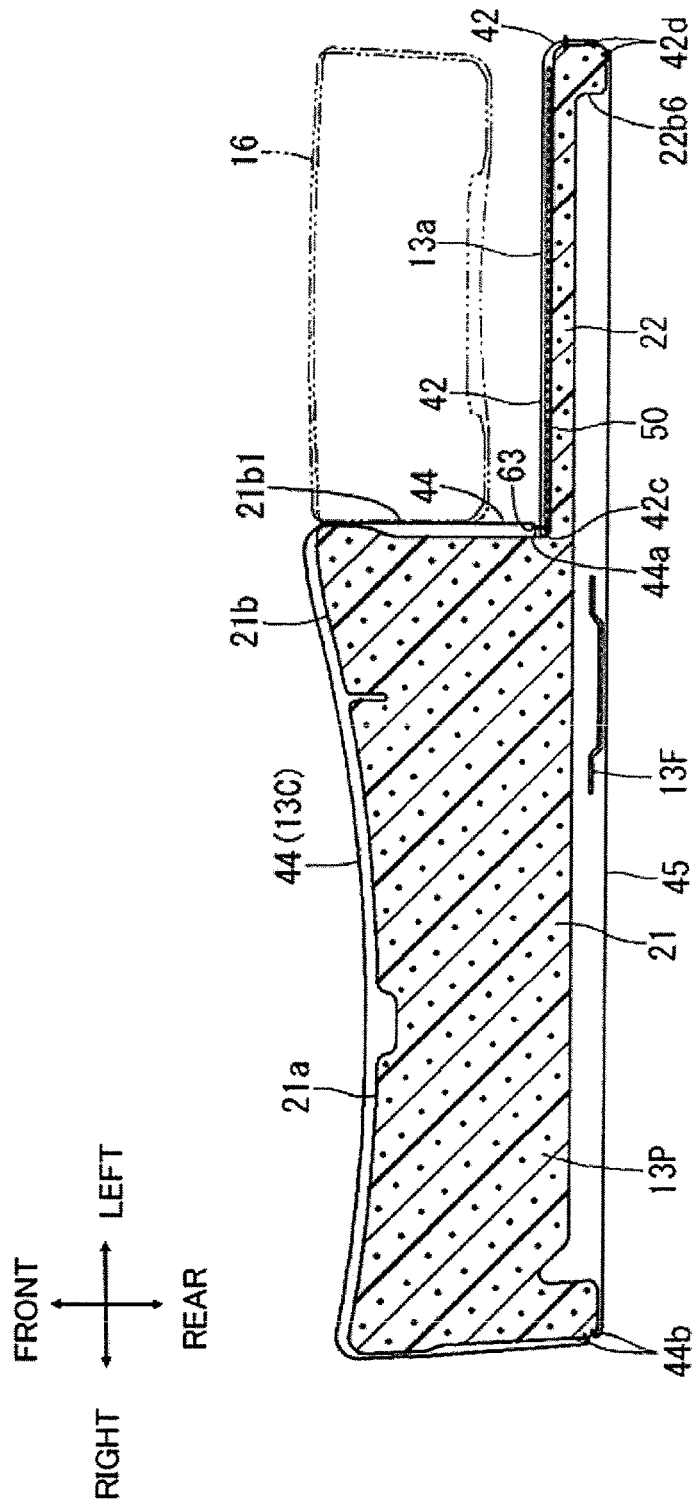
FIG. 5 is a sectional view taken along line V-V in FIG. 2.

As shown in FIGS. 2, 4, and 5, five holes penetrating in a front-and-rear direction are provided in an outer peripheral edge portion of the rear wall portion 22b. A first through hole 22b1 having a substantially rectangular shape in a middle portion of a left-and-right direction, and a second through hole 22b2 having a substantially rectangular shape in a right side end portion are formed in a coupling portion of the rear wall portion 22b and the upper wall lower surface portion 22a3. The first through hole 22b1 and the second through hole 22b2 take the left-and-right direction as a longitudinal direction in a front view. The first through hole 22b1 and the second through hole 22b2 are almost the same length in an upper-and-lower direction, while the first through hole 22b1 is longer than the second through hole 22b2 in the left-and-right direction. A third through hole 22b3 having a substantially rectangular shape in an upper portion of the upper-and-lower direction, and a fourth through hole 22b4 having a substantially rectangular shape in a middle portion are formed in a coupling portion of the rear wall portion 22b and the side wall portion 21b1. The third through hole 22b3 and the forth through hole 22b4 take an upper-and-lower direction as a longitudinal direction in a front view. The third through hole 22b3 and the forth through hole 22b4 are almost the same length in the left-and-right direction, while the third through hole 22b3 is longer than the forth through hole 22b4 in the upper-and-lower direction. Length in the left-and-right direction of the third through hole 22b3 and the forth through hole 22b4, which is length in a shorter-length direction, are shorter than length in the upper-and-lower direction of the first through hole 22b1 and the second through hole 22b2, which is length in a shorter-length direction. Further, a fifth through hole 22b5 is formed in a lower side of the rear wall portion 22b, which length is almost the same length of the rear wall portion 22b in the left-and-right direction. As shown in FIG. 4, a side rib portion 22b6, which projects backward and extends in the upper-and-lower direction, is formed on a left side end portion of the rear wall portion 22b. The left side end portion of the rear wall portion 22b is coupled with a left side end portion of the lower wall portion 22c only via a part formed with the side rib portion 22b6. Here, the first through hole 22b1, the second through hole 22b2, the third through hole 22b3, the fourth through hole 22b4, and the fifth through hole 22b5 correspond to "through hole" in the claims.

As shown in FIG. 2, the back cover 13C is formed in that a plurality of cloth-like parts is sewn and connected with each other, and is covered over the back pad 13P. Also, a board 50 is a flat-plate-shaped member made of a polyethylene resin or a polypropylene resin, and has a substantially rectangular shape corresponding to the rear surface of the seat recess portion 13a in a front view. The board 50 may be made of other materials such as paper as long as the material can be sewn and has rigidity about a resin plate. The board 50 is provided with protrusion portions projecting outward in an in-plane direction on portions corresponding to the first through hole 22b1 to the fifth through hole 22b5 respectively, when the board 50 is mounted on a front surface of the rear wall portion 22b of the back pad 13P. That is, a first protrusion portion 51, a second protrusion portion 52, a third protrusion portion 53, a fourth protrusion portion 54, and a fifth protrusion portion 55 and a sixth protrusion portion 56 correspond to the first through hole 22b1, the second through hole 22b2, the third through hole 22b3, the fourth through hole 22b4, and the fifth through hole 22b5 respectively. The fifth protrusion portion 55 projecting rightward and the sixth protrusion portion 56 projecting downward are formed at a position corresponding to the fifth through hole 22b5. The first protrusion portion 51 and the second protrusion portion 52 project upward by approximately 7 mm from upper end portions of the first through hole 22b1 and the second through hole 22b2. The third protrusion portion 53, the fourth protrusion portion 54, and the fifth protrusion portion 55 project rightward by approximately 50 mm from right end portions of the third through hole 22b3, the fourth through hole 22b4, and the fifth through hole 22b5 respectively. The sixth protrusion portion 56 projects downward by approximately 14 mm from a lower end portion of the fifth through hole 22b5. Upper ends of the first through hole 22b1 and the second through hole 22b2 are almost the same height, and right end portions of the third through hole 22b3, the fourth through hole 22b4, and the fifth through hole 22b5 are almost the same line in the left-and-right direction. Here, the first protrusion portion 51, the second protrusion portion 52, the third protrusion portion 53, the fourth protrusion portion 54, the fifth protrusion portion 55, and the sixth protrusion portion 56 correspond to "protrusion portion" in the claims.

As shown in FIG. 3, an upper cover portion 41 is a part covering the upper wall portion 22a of the back cover 13C, and a rear cover portion 42 is a part covering the rear wall portion 22b of the back cover 13C. A front side end portion 41a of the upper cover portion 41 and an upper end portion 42a of the rear cover portion 42 are sewn integrally at an upper sewn portion 61 with respect to an upper end portion of the board 50. Also, a lower cover portion 43 is a part covering the lower wall portion 22c of the back cover 13C, and a rear cover portion 42 is a part covering the rear wall portion 22b of the back cover 13C. A front side end portion 43a of the lower cover portion 43 and a lower end portion 42b of the rear cover portion 42 are sewn integrally at a lower sewn portion 62 with respect to a lower end portion side of the board 50. The back cover 13C in such a state is mounted with respect to the back pad 13P in the following way. The first protrusion portion 51 and the second protrusion portion 52 of the board 50 are inserted into the first through hole 22b1 and the second through hole 22b2 respectively, and tip end portions of the first protrusion portion 51 and the second protrusion portion 52 are engaged with an upper wall rear surface portion 22a5 of the upper wall portion 22a. Here, since the upper wall rear surface portion 22a5 projects forward substantially by a thickness of the board 50 from a front surface of the rear wall portion 22b, the deformation of the first protrusion portion 51 and the second protrusion portion 52 of the board 50 is suppressed due to the engagement. The sixth protrusion portion 56 of the board 50 is inserted into the fifth through hole 22b5, and a tip end portion of the sixth protrusion portion 56 is engaged with the lower wall rear surface portion 22c3 of the lower wall portion 22c. Here, since the lower wall rear surface portion 22c3 projects forward substantially by the thickness of the board 50 from the front surface of the rear wall portion 22b, the deformation of the sixth protrusion portion 56 of the board 50 is suppressed due to the engagement. In such a state, a rear side end portion 41b of the upper cover portion 41 is engaged with the back frame 13F via a hook member, and a rear side end portion 43b of the lower cover portion 43 is engaged with the back frame 13F via a hook member. The upper sewn portion 61 and the lower sewn portion 62 are formed along the outer peripheral edge portion of the rear wall portion 22b. Here, the outer peripheral edge portion of the rear wall portion 22b, except the first through hole 22b1, the second through hole 22b2, the third through hole 22b3, the fourth through hole 22b4, and the fifth through hole 22b5, corresponds to "outer peripheral edge portion" in the claims. Also, the upper wall rear surface portion 22a5 and the lower wall rear surface portion 22c3 correspond to "back surface portion" in the claims.

As shown in FIG. 4, a right seat cover portion 44 is a part covering a front surface and side surface of the right seat portion 21 of the back cover 13C, and a rear cover portion 42 is a part covering the rear wall portion 22b of the back cover 13C. A left rear side end portion 44a of the right seat cover portion 44 and a right end portion 42c of the rear cover portion 42 are sewn integrally at the upper sewn portion 63 with respect to a right end portion of the board 50. The right sewn portion 63 is formed along the outer peripheral edge portion of the rear wall portion 22b. A part of a left fastener 42d is mounted on a left end portion side of the rear cover portion 42. A part of a right fastener 44b is mounted on a right rear side end portion of the right seat cover portion 44. Further, a back surface portion 45 is a part in which the back cover 13C covers a back surface portion of the seat back pad 13P, and another part of the left fastener 42d is mounted on a left end portion side of the back surface portion 45, and another part of the right fastener 44b is mounted on a right end portion side of the back surface portion 45. The back cover 13C in such a state is mounted to the back pad 13P in the following way. The fourth protrusion portion 54 of the board 50 is inserted into the fourth through hole 22b4, and a tip end portion of the forth protrusion portion 54 is engaged with a bank rear surface portion 21b2 of the bank portion 21b. Here, since the bank rear surface portion 21b2 projects forward substantially by the thickness of the board 50 from the front surface of the rear wall portion 22b, the deformation of the fourth protrusion portion 54 of the board 50 is suppressed due to the engagement. Similar to the engagement of fourth protrusion portion 54, tip end portions of the third protrusion portion 53 and the fifth protrusion portion 55 are engaged with the bank rear surface portion 21b2 of the bank portion 21b. In such a state, the back cover 13C is covered over the entire back pad 13P with the left fastener 42d and the right fastener 44b being closed. Here, the bank rear surface portion 21b2 corresponds to "back surface portion" in the claims.

As shown in FIGS. 1 and 3, the armrest 16 is mounted on the seat recess portion 13a of the seat back 13 such that the armrest 16 is rotated centering on a rotation shaft 16a extending in a left-and-right direction and can be accommodated in the seat recess portion 13a as an accommodated state and be projected forward from the seat recess portion 13a as a projected state. The armrest 16 in the projected state further includes an upper surface used as a table or a seat surface for a child to sit down.

The embodiment configured as above has following effects. The board 50 is mounted on the back pad 13P in a state where the rear wall portion 22b, the upper wall lower surface portion 22a3, the lower wall upper surface portion 22c1, and the side wall portion 21b1 of the back pad 13P, which correspond to the seat recess portion 13a of the seat back 13, are covered by the back cover 13C. The board 50 is mounted to the back pad 13P by being engaged with the back surface portion of the back pad 13P, with the tip end portion of the first protrusion portion 51 penetrating into the first through hole 22b1, the tip end portion of the second protrusion portion 52 penetrating into the second through hole 22b2, the tip end portion of the third protrusion portion 53 penetrating into the third through hole 22b3, the tip end portion of the fourth protrusion portion 54 penetrating into the fourth through hole 22b4, and the tip end portions of the fifth protrusion portion 55 and the sixth protrusion portion 56 penetrating into the fifth through hole 22b5. Since a part of the back cover 13C corresponding to the seat recess portion 13a of the seat pad 13 is coupled to the board 50 on the upper sewn portion 61, the lower sewn portion 62, and the right sewn portion 63, the seat recess portion 13a is formed with the board 50 being engaged with the back surface portion of the back pad 13P and being contacted with the middle seat portion 22. Here, tip end portions of the first protrusion portion 51 to the sixth protrusion portion 56 of the board 50 pass through the first through hole 22b1 to the fifth through hole 22b5, and can be abutted against the back surface portion of the back pad 13P by a relatively large area. This is because that there is no need to form an overhang portion to the back pad 13P, which is different from the related art mentioned above. In this way, the back cover 13C can be disposed on the middle seat portion 22 of the back pad 13P in a good appearance, and mounting strength of the back cover 13C mounted to the back pad 13P can be ensured simultaneously. Further, manufacturing workability is good since manufacturing is performed only by passing the tip end portions of the first protrusion portion 51 to the sixth protrusion portion 56 of the board 50 through the first through hole 22b1 to the fifth through hole 22b5 and engaging the tip end portions of the first protrusion portion 51 to the sixth protrusion portion 56 of the board 50 with the back surface portion of the back pad 13P.

The part of the back cover 13C corresponding to the seat recess portion 13a of the seat back 13 is coupled to the upper sewn portion 61, the lower sewn portion 62, and the right sewn portion 63 which are formed along the outer peripheral edge portion of the rear wall portion 22b. In this way, the back cover 13C is drawn by the upper sewn portion 61, the lower sewn portion 62, and the right sewn portion 63, and is mounted closely to the rear wall portion 22b, the upper wall portion 22a, the lower wall portion 22c, and the side wall portion 21b1, and thus an appearance of the seat recess portion 13a is improved.

Further, the upper wall rear surface portion 22a5, the lower wall rear surface portion 22c3, and the bank rear surface portion 21b2, which are the back surface portion of the back pad 13P on which the first protrusion portion 51 to the sixth protrusion portion 56 of the board 50 are engaged and mounted, project forward substantially by the thickness of the board 50 from the front surface of the rear wall portion 22b. In this way, when the board 50 is disposed to abut against the rear surface portion 22b of the back pad 13P, front surface portions of the first protrusion portion 51 to the sixth protrusion portion 56 of the board 50 abut against the back surface portion of the back pad 13P without bending the back pad 13P. Since unnecessary force in an out-of-plane direction is not applied to the board 50 and the board 50 is not deformed, the back cover 13C is mounted on the rear wall portion 22b, the upper wall portion 22a, the lower wall portion 22c, and the side wall portion 21b1 of the back pad 13P in a good appearance.

A specific embodiment has been described above, and the present disclosure is not limited to the above appearances and structures. Various modifications, additions and deletions are possible without changing the scope and spirit of the present disclosure. For example, the following are exemplified.

(1) In the above embodiment, the recess portion of the back pad 13P is formed as the part in which the rear wall portion 22b is surrounded by the upper wall lower surface portion 22a3, the side wall portion 21b1, and the lower wall upper surface portion 22c1 and which is opened on the left. However, the present disclosure is not limited thereto, and the recess portion may be closed on the left and provided with a wall thereto. In such a case, a left side of an outer peripheral edge portion of the board 50 is also fixed by being sewn to the back cover 13C.

(2) In the above embodiment, the first protrusion portion 51 and the second protrusion portion 52 project upward by approximately 7 mm from the upper end portions of the first through hole 22b1 and the second through hole 22b2, and the sixth protrusion portion 56 projects downward by approximately 14 mm from the lower end portion of the fifth through hole 22b5. That is, an area where the protrusion portions are engaged with the back surface portion of the back pad 13P is relatively small. This is because that, the third protrusion portion 53, the fourth protrusion portion 54, and the fifth protrusion portion 55 project rightward by approximately 50 mm from the right end portions of the third through hole 22b3, the fourth through hole 22b4, and the fifth through hole 22b5 respectively, and the engagement strength of an upper-and-lower part of the board 50 is not so required since the left side of the outer peripheral edge portion of the board 50 is fixed by the left fastener 42d via the back cover 13C. If necessary, it is possible to increase projected length of the first protrusion portion 51, the second protrusion portion 52, and the sixth protrusion portion 56, so as to increase the area where the first protrusion portion 51, the second protrusion portion 52, and the sixth protrusion portion 56 and the back surface portion are engaged with the back pad 13P.

(3) In the above embodiment, the back cover 13C is fixed to the board 50 by being sewn, but the present disclosure is not limited thereto, and the back cover 13C can be fixed by adhesion, heat welding, etc.

(4) In the above embodiment, the present disclosure is applied to a seat of an automobile, and the present disclosure can be applied to a seat installed in an aircraft, a ship, a train, etc.

The disclosure provides illustrative, non-limiting examples as follows:

A first aspect of the present disclosure is a vehicle seat including: a seat back including: a back pad configured to support a back of an occupant; and a back cover covering the back pad, wherein the back pad is provided with a recess portion opened forward and configured to accommodate an armrest, a plurality of through holes penetrating in a front-and-rear direction are provided in an outer peripheral edge portion of a rear wall portion of the recess portion, and a flat-plate-shaped board is mounted on a rear wall portion side of the back cover which covers the rear wall portion, wherein at least one protrusion portion extending toward an outer side in an in-plane direction of the rear wall portion is provided on a part of the board corresponding to at least one of the plurality of through holes, and wherein when the back pad is covered by the back cover, the back cover covers an inner surface of the recess portion, and the at least one protrusion portion inserted into the at least one of the plurality of through holes is engaged and mounted on a back surface portion of the back pad on an opposite side of the rear wall portion.

According to the first aspect, in a state where the inner surface of the recess portion of the back pad is covered by the back cover, the flat-plate-shaped board mounted on the rear wall portion side of the back cover is mounted on the back pad. The mounting method is that the at least one protrusion portion passes through the at least one of the plurality of through holes and is engaged with the back surface portion of the back pad on an opposite side of the rear wall portion. The protrusion portion of the board can abut against the back surface portion of the back pad by a relatively large area. In this way, the back cover can be disposed on the inner surface of the recess portion in a good appearance, and mounting strength thereof can be ensured. Further, manufacturing workability is good since manufacturing is performed only by passing the at least one of protrusion portion of the board through the at least one of the plurality of through holes and fixing the at least one of protrusion portion of the board to the back surface portion of the back pad.

A second aspect of the present disclosure is characterized in that in the first aspect, the board is mounted to the back cover by being sewn along the outer peripheral edge portion of the rear wall portion.

According to the second aspect, since the back cover is drawn into the recess portion of the back pad by sewn portions which is along the outer peripheral edge portion of the rear wall portion of the back pad, the back cover is mounted closely to the inner surface of the recess portion of the back pad, and thus an appearance thereof is improved.

A third aspect of the present disclosure is characterized in that in the first aspect, the back surface portion of the back pad on which the at least one protrusion portion is engaged and mounted is spaced apart forward by a thickness of the board from a surface of the rear wall portion abutting on the board.

According to the third aspect, when the board is disposed to abut against the rear wall portion of the back pad, front surface portion of the at least one of protrusion portion of the board abuts against the back surface portion of the back pad without bending the back pad. In this way, since unnecessary force in an out-of-plane direction is not applied to the board and the board is not deformed, the back cover is mounted on the inner surface of the recess portion of the back pad in a good appearance.

A fourth aspect of the present disclosure is characterized in that in the first aspect, the at least one protrusion portion includes a plurality of protrusion portions extending toward the outer side in the in-plane direction of the rear wall portion and respectively provided on each part of the board corresponding to each of the plurality of through holes.

What is claimed is:

1. A vehicle seat comprising:
    a seat back including:
        a back pad configured to support a back of an occupant; and
        a back cover covering the back pad,
    wherein the back pad is provided with a recess portion opened forward and configured to accommodate an armrest, a plurality of through holes penetrating in a front-and-rear direction are provided in an outer peripheral edge portion of a rear wall portion of the recess portion, and a flat-plate-shaped board is mounted on a rear wall portion side of the back cover which covers the rear wall portion,
    wherein at least one protrusion portion extending toward an outer side in an in-plane direction of the rear wall portion is provided on a part of the board corresponding to at least one of the plurality of through holes, and
    wherein when the back pad is covered by the back cover, the back cover covers an inner surface of the recess portion, and the at least one protrusion portion inserted into the at least one of the plurality of through holes is engaged and mounted on a back surface portion of the back pad on an opposite side of the rear wall portion.

2. The vehicle seat according to claim 1, wherein the board is mounted to the back cover by being sewn along the outer peripheral edge portion of the rear wall portion.

3. The vehicle seat according to claim 1, wherein the back surface portion of the back pad on which the at least one protrusion portion is engaged and mounted is spaced apart forward by a thickness of the board from a surface of the rear wall portion abutting on the board.

4. The vehicle seat according to claim 1, wherein the at least one protrusion portion includes a plurality of protrusion portions extending toward the outer side in the in-plane direction of the rear wall portion and respectively provided on each part of the board corresponding to each of the plurality of through holes.

* * * * *